July 28, 1936.   J. H. WOODALL   2,049,037
ONE-PIECE GUARD
Filed March 30, 1933   2 Sheets-Sheet 1
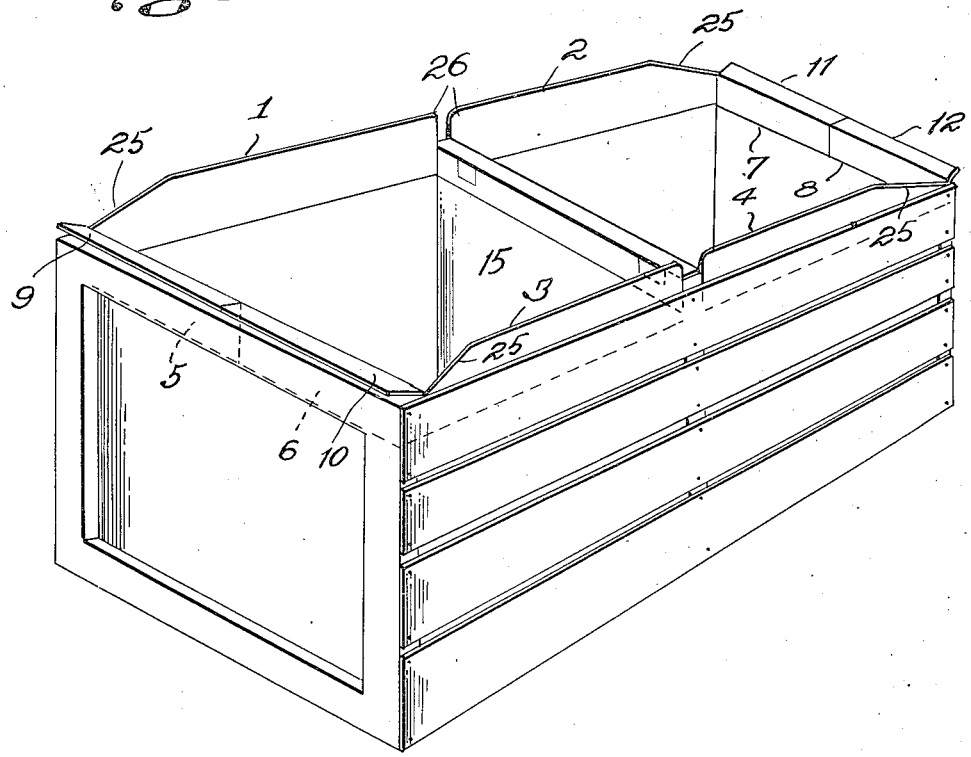
Fig. 1.
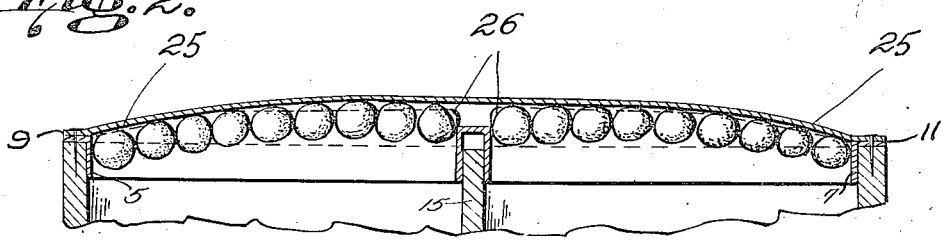
Fig. 2.
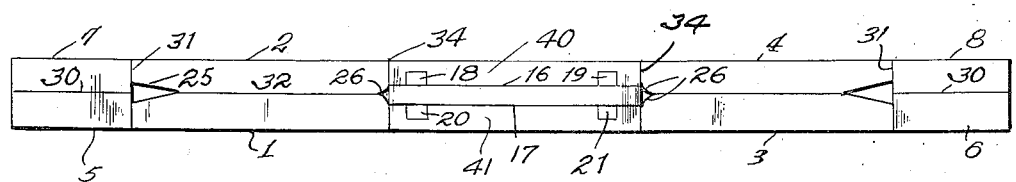
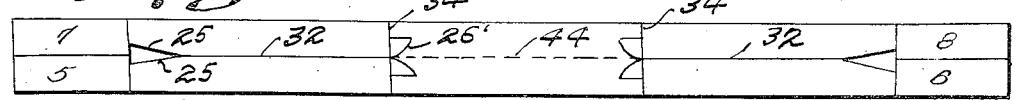
Fig. 7.
INVENTOR: J. H. Woodall
By J. T. Newton Attys.

July 28, 1936.　　　J. H. WOODALL　　　2,049,037
ONE-PIECE GUARD
Filed March 30, 1933　　2 Sheets-Sheet 2
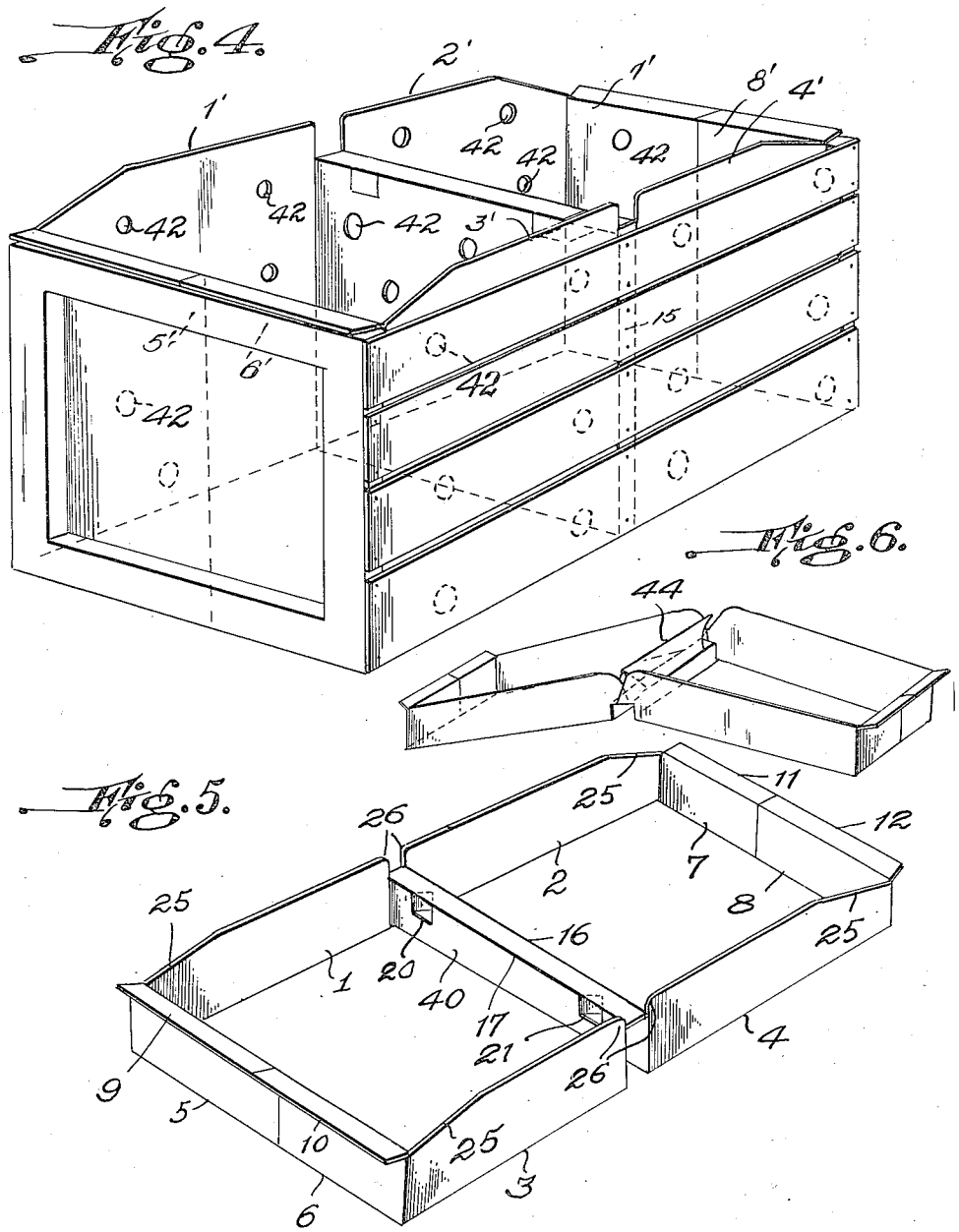
INVENTOR.
J. H. Woodall
BY J. T. Newton
ATTORNEYS.

Patented July 28, 1936

2,049,037

UNITED STATES PATENT OFFICE 2,049,037

ONE-PIECE GUARD

John H. Woodall, Woodland, Ga.

Application March 30, 1933, Serial No. 663,634

7 Claims. (Cl. 217—3)

This invention relates to a fruit guard for the protection of fruit, such as oranges, peaches, apples, vegetables, etc. while being packed in a box or crate for market.

It is well known that when fruit is packed in a crate or box, especially if the fruit extends above the upper edge of the box when full and the top of the box is applied to cover the fruit, that the fruit must be forced down somewhat into the box and in so forcing the fruit the upper edges of the box are liable to cut the fruit and the fruit, being thus mutilated or cut, is more liable to rot or spoil than when there are no cut or bruised places on the fruit. Furthermore, these crates consist of slats on their sides and the fruit rubbing against these slats is liable to be cut. It is an object of my invention to produce a guard that will prevent the edges of the box or the slats from cutting or bruising the fruit.

It has heretofore been known that fruit guards placed around the edge would thus protect the fruit but most of such guards have been in separate pieces, one for each side and one for each end of the box, or two pieces, one piece extending around an end and half of the two sides and another similar piece for another end of the box. It is an object of my invention to save the separate handling of two or more guards by cutting my guard from a single piece of paper or pasteboard in such a way that after the guard has been properly creased and cut it will extend over both sides, both ends and a middle partition of the box or crate. By so constructing the guard, it can be economically cut from a single piece of paper and in use it may be handled at much greater speed and much less trouble than is required to handle the guards when in a plurality of separate pieces. All necessary lines, slots and creases can be made with one impression of a machine.

It is also well known that in fruit boxes made up of slats it is desirable that a guard be extended from top to bottom of the box to prevent the fruit from coming in contact with the inner edges of the slats. Hence, by a modified construction my one-piece guard may extend from top to bottom of the box or crate and it is an object of a modified form of my invention to provide a one-piece guard extending around the four upper edges of the box and then into the box from top to bottom. It is desirable, however, in such a guard that the box be properly ventilated so my invention contemplates having ventilating holes in that part of the guard extending from top to bottom on the interior of the box.

With these and other objects in view which will be developed as the description proceeds, I will now describe my invention in connection with the accompanying drawings in which:—

Figure 1 is an illustration of an empty box or crate with my one-piece guard applied thereto.

Figure 2 illustrates a crate with fruit therein and the fruit at the top extending above the upper edges of the crate.

Figure 3 illustrates the lines on which a single piece of paper may be cut and creased to form the guards around both sides and ends and over a partition in the middle of a crate or box.

Figure 4 shows a modification wherein the guard extends from the top to the bottom of a crate and is perforated for ventilation purposes.

Figure 5 shows the guard folded in condition to be applied to the box.

Figure 6 shows a second modification of the way in which the guard may be folded.

Figure 7 shows a modification of the cuts and creases shown in Figure 3.

My guard comprises, when cut and creased, four portions 1, 2, 3, 4, that extend along the two sides of the crate and project above its upper edge. The guard also comprises end portions, 5, 6, 7, 8; 5 and 7 being bent over from the sides 1 and 2, respectively on the line 31, and 6 and 8 being end portions bent over, respectively, from the side portions 3 and 4.

The portions 5, 6, 7, 8 have flaps 9, 10, 11, 12, bent outwardly, respectively, from the portions 5, 6, 7, 8 to rest on the top of the box or crate, as shown in Figure 1.

The ordinary box or crate has a partition 15 near its middle and to cover the edges of this partition my one piece guard may be creased along parallel lines 16, 17. I preferably cut out three edges (and crease the fourth edge) of each of four rectangles 18, 19, 20, and 21 to form flaps, all or part of which may be projected inwardly, as shown in Fig. 5, to rest on the center partition of the crate and thereby hold the guard up at its center. When fruit is packed high it is desirable to raise the guard high at center, as best shown in Figure 2. The holes left by the flaps after they are turned under are of convenience to handle the guard.

I preferably incline the sides at their ends by lines 25 so that when the top of the box or crate is nailed on there will be no sharp corners left at the ends of the guard pieces 1, 2, 3 and 4. For the same reason I curve the ends of these parts 1, 2, 3 and 4 as indicated at 26. In this way no sharp or abrupt corners are left projecting above the box top. The pieces 9, 10, 11 and 12, as may be readily seen, are bent down on the upper edges of the ends of the box or crate and they will prevent the outer ends of the guard from slipping down when the top of the box is nailed on.

My one-piece guard may be cut from a single strip of paper on lines clearly shown in Figure 3. There is a cut 30 extending from the left-hand side of Figure 3 to the line 31. The line 31 is only creased and not cut. A triangle which includes the lines 25 is cut out to form the inclined edges 25 (Fig. 1). A line 32 is cut; and an area is cut out to form the rounded edges 26 (Fig. 1). The lines 34 are cut only between lines 16 and 17, and are creased the rest of their length. In the middle section of the sheet the lines 16 and 17 are only creased while the rectangles 18 and 19, 20 and 21 are cut on one end and both sides and creased on the other end so the flaps may be bent inwardly, as shown best in Figure 5. When fruit is packed high in the center, as shown in Figure 2, the guard is raised above the middle partition and rests on the turned in flaps.

The right hand half of the one piece strip is cut in the same way and need not be further described.

When the one-piece strip is cut as described, it may be handled as a single unit or article and by reason of the creased and cut sides the parts easily adapt themselves to the position shown best in Figure 5.

My guard, it will be observed, is firmly supported at both ends and over the middle partition of the crate and being thus supported, there is no danger of the guard falling down into the box while packing the layer or plurality of layers at the top.

As a modification of my invention, I may have the sides and ends of the guard extend down to the bottom of the crate, as shown in Figure 4. In this figure the sides and ends of the guard are designated by the same reference characters used in Figure 1 but with prime marks added thereto, i. e., sides 1', 2', 3', and 4', and ends 5', 6', 7', and 8'. Preferably holes such as 42 are provided in the guard for ventilation. Otherwise the modification shown in Figure 4 is similar to the form of guard shown in Figure 1. It will be noted that the way in which I cut my strip lends itself to providing for these sides and ends that extend from bottom to top of the box. This extension of the sides and ends to the bottom of the crate is obtained by merely cutting and creasing a wide band of paper material in the same way as the narrow band shown in Figure 3, the lines 31 and 34 being extended across the entire width of the wider band.

In Figures 6 and 7 I have shown another slight modification of the guard where, instead of the middle section being creased on the lines 16 and 17, it is creased on a single line 44 and the corners 26' are slightly different from the corners 26 of Figures 3 and 5; and when flaps similar to 18, 19, 20, and 21 are bent under the guard, the guard will rest on the middle partition of the box and in so doing throws the guard higher at the center, a condition desired when fruit is packed high at the center.

It will thus be seen that my one-piece guard may be easily formed, as described, into shapes shown in the three modifications. Indeed, this form of guard may be similarly cut to embody other apparent shapes and I do not wish my invention to be limited to the exact form shown.

What I claim as my invention is:—

1. A guard of the character described having two side and end guards to fit around a four-sided crate or box having a partition, said guard having a middle portion adapted to cover the top of the partition in the box, said middle portion being integral with all the side guards and cut and folded from a single strip of material.

2. A guard for a fruit box or crate made from a single sheet of material, said guard comprising two pairs of side pieces and two pairs of end pieces and a middle portion angularly related to the side pieces and connecting them, the two pairs of end pieces at each end being folded over the box top and meeting approximately midway between the side pieces, all portions of said guard being in one integral piece to facilitate easy handling.

3. A guard for the edges of a fruit box, said box having a middle partition, said guard having side portions and a middle portion having a top portion to cover the partition and two side portions extending down from the top at the top edges of the partition, the sides of said middle portion being integral with all the side guards of both sections of the box.

4. A blank to be opened into an edge guard for a partitioned produce box comprising: an elongated strip of sheet material longitudinally creased in a central zone to form a saddle portion for the partition of the box, and longitudinally split from the central zone toward both ends of the strip to form guard portions for both side walls of the box on both sides of the partition.

5. A blank to be opened into an edge guard for a partitioned produce box comprising: an elongated strip of sheet material longitudinally creased in a central zone to form a saddle portion for the partition of the box, and longitudinally split from the central zone toward both ends of the strip to form guard portions for both side walls of the box on both sides of the partition, the longitudinally split portions being extended and transversely creased to also form guard portions for the ends of the box.

6. A blank to be opened into an edge guard for a partitioned produce box comprising: an elongated strip of sheet material longitudinally creased in a central zone to form a saddle portion for the partition of the box, the saddle portion being provided with means to support it vertically spaced above the upper edge of the partition, and the zones of the strip on both sides of said central zone being longitudinally split to form guard portions for both side walls of the box on both sides of the partition.

7. A blank to be opened into an edge guard for a partitioned produce box comprising: an elongated strip of sheet material longitudinally creased in a central zone to form a saddle portion for the partition of the box, the saddle portion being provided with means to support it vertically spaced above the upper edge of the partition, and the zones of the strip on both sides of said central zone being longitudinally split to form guard portions for both side walls of the box on both sides of the partition, the longitudinally split portions being extended and transversely creased to also form guard portions for the ends of the box.

JOHN H. WOODALL.